United States Patent
Hira et al.

(10) Patent No.: US 10,135,635 B2
(45) Date of Patent: Nov. 20, 2018

(54) ENCODING CONTROL PLANE INFORMATION IN TRANSPORT PROTOCOL SOURCE PORT FIELD AND APPLICATIONS THEREOF IN NETWORK VIRTUALIZATION

(71) Applicant: Nicira, Inc., Palo Alto, CA (US)

(72) Inventors: Mukesh Hira, Palo Alto, CA (US); Alexander Tessmer, Mountain View, CA (US); Anupam Chanda, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/422,065

(22) Filed: Feb. 1, 2017

(65) Prior Publication Data
US 2017/0149583 A1    May 25, 2017

Related U.S. Application Data

(63) Continuation of application No. 14/320,453, filed on Jun. 30, 2014, now Pat. No. 9,577,927.

(51) Int. Cl.
*H04L 12/28* (2006.01)
*H04L 12/46* (2006.01)
(Continued)

(52) U.S. Cl.
CPC .......... *H04L 12/4633* (2013.01); *H04L 12/18* (2013.01); *H04L 45/745* (2013.01); *H04L 49/354* (2013.01); *H04L 69/22* (2013.01)

(58) Field of Classification Search
None
See application file for complete search history.

(56) References Cited

U.S. PATENT DOCUMENTS

| 5,265,092 A | 11/1993 | Soloway et al. |
| 7,079,544 B2 | 7/2006 | Wakayama et al. |

(Continued)

FOREIGN PATENT DOCUMENTS

WO    WO 2016/003490    1/2016

OTHER PUBLICATIONS

International Search Report and Written Opinion of PCT/US2014/072882, dated Jun. 24, 2015, Nicira, Inc.

(Continued)

*Primary Examiner* — Bob A Phunkulh
(74) *Attorney, Agent, or Firm* — ADELI LLP

(57) ABSTRACT

A novel method that uses the source port field in the transport or connection layer (L4) header to encode control plane information is provided. Specifically, the method encodes control plane information in UDP or TCP source port field of data plane tunnels in an overlay network such as VXLAN. Network virtualization is implemented by a network controller over an overlay network on the physical fabric. The network controller provides a mapping table to the data plane hosts for mapping the encoded bits in the source port field to semantically richer information. The data plane hosts in turn uses the encoded source bits and the mapping table to infer this semantically richer information. This semantically richer information is used to allow receivers of proxied traffic to learn the address of the original sender. The semantically richer information can also be used to enable ECMP for the transmitted packets.

20 Claims, 12 Drawing Sheets

(51) Int. Cl.
*H04L 12/18* (2006.01)
*H04L 12/741* (2013.01)
*H04L 12/931* (2013.01)
*H04L 29/06* (2006.01)

(56) References Cited

U.S. PATENT DOCUMENTS

| | | | |
|---|---|---|---|
| 7,209,977 B2 | 4/2007 | Archarya et al. | |
| 7,369,572 B1 * | 5/2008 | Johnson | H04L 41/5003 370/419 |
| 7,406,540 B2 | 7/2008 | Acharya et al. | |
| 8,619,587 B2 * | 12/2013 | Yong | H04L 69/22 370/241 |
| 8,630,294 B1 * | 1/2014 | Keen | H04L 45/7453 370/252 |
| 9,019,962 B1 * | 4/2015 | Ghosh | H04L 49/3009 370/392 |
| 9,356,866 B1 * | 5/2016 | Sivaramakrishnan | H04L 45/7453 |
| 9,531,627 B1 * | 12/2016 | Alvarez | H04L 45/507 |
| 9,577,927 B2 | 2/2017 | Hira et al. | |
| 2003/0065711 A1 | 4/2003 | Acharya et al. | |
| 2004/0170173 A1 * | 9/2004 | Pan | H04J 3/1617 370/392 |
| 2004/0267897 A1 | 12/2004 | Hill et al. | |
| 2005/0053079 A1 | 3/2005 | Havala | |
| 2005/0055435 A1 * | 3/2005 | Gbadegesin | H04L 29/06 709/224 |
| 2005/0132044 A1 | 6/2005 | Guingo et al. | |
| 2006/0028999 A1 | 2/2006 | Iakobashvili et al. | |
| 2006/0029056 A1 | 2/2006 | Perera et al. | |
| 2006/0037075 A1 | 2/2006 | Frattura et al. | |
| 2006/0072474 A1 * | 4/2006 | Mitchell | H04L 43/12 370/252 |
| 2006/0206655 A1 | 9/2006 | Chappell et al. | |
| 2007/0055789 A1 | 3/2007 | Claise et al. | |
| 2008/0151893 A1 | 6/2008 | Nordmark et al. | |
| 2010/0046512 A1 * | 2/2010 | Xia | H04L 12/4633 370/389 |
| 2010/0085974 A1 * | 4/2010 | Miyabe | H04L 45/00 370/395.31 |
| 2012/0057599 A1 * | 3/2012 | Yong | H04L 47/2483 370/395.53 |
| 2012/0099602 A1 | 4/2012 | Nagapudi et al. | |
| 2013/0019008 A1 | 1/2013 | Jorgenson et al. | |
| 2013/0058341 A1 | 1/2013 | Fulton et al. | |
| 2013/0250951 A1 | 9/2013 | Koganti | |
| 2013/0318219 A1 | 11/2013 | Kancherla | |
| 2013/0329584 A1 | 12/2013 | Ghose et al. | |
| 2013/0336315 A1 * | 12/2013 | Guichard | H04L 12/4645 370/389 |
| 2014/0086253 A1 | 3/2014 | Yong | |
| 2014/0092738 A1 * | 4/2014 | Grandhi | H04L 47/52 370/235 |
| 2014/0092907 A1 | 4/2014 | Sridhar et al. | |
| 2014/0348006 A1 | 11/2014 | Jain et al. | |
| 2015/0003255 A1 * | 1/2015 | Frost | H04L 45/24 370/238 |
| 2015/0029872 A1 * | 1/2015 | Pignataro | H04L 43/10 370/252 |
| 2015/0082370 A1 | 3/2015 | Jayaraman et al. | |
| 2015/0146539 A1 * | 5/2015 | Mehta | H04L 47/125 370/237 |
| 2015/0163323 A1 | 6/2015 | Moreno et al. | |
| 2015/0180773 A1 | 6/2015 | DeCusatis et al. | |
| 2015/0195137 A1 | 7/2015 | Kashyap et al. | |
| 2015/0295831 A1 | 10/2015 | Kumar et al. | |

OTHER PUBLICATIONS

Davie, B., et al., "A Stateless Transport Tunneling Protocol for Network Virtualization (STT); draft-davie-stt-06," Internet Engineering Task Force (IETF) Standard Working Draft, Internet Society (ISOC), Apr. 15, 2014, pp. 1-21, VMware, Inc., Geneva, Switzerland.

Mahalingam, M, et al., "XVLAN: A Framework for Overlaying Virtualized Layer 2 Networks over Layer 3 Networks; draft-mahalingam-dutt-dcops-vxlan-09.txt," Internet Engineering Task Force (IETF) Internet Draft, Apr. 10, 2014, pp. 1-23.

Touch, J., et al., "Transparent Interconnection of Lots of Links (TRILL): Problem and Applicability Statement," May 2009, pp. 1-17, IETF Trust, RFC 5556.

* cited by examiner

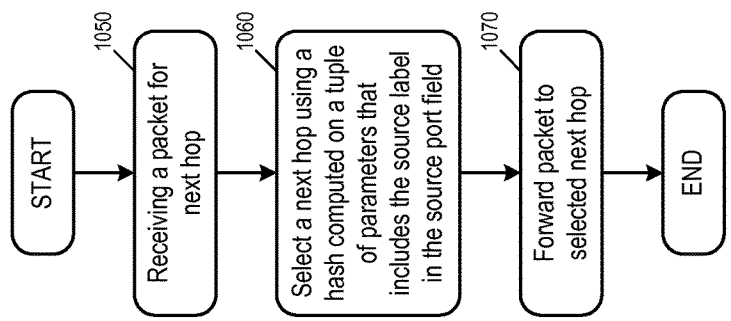
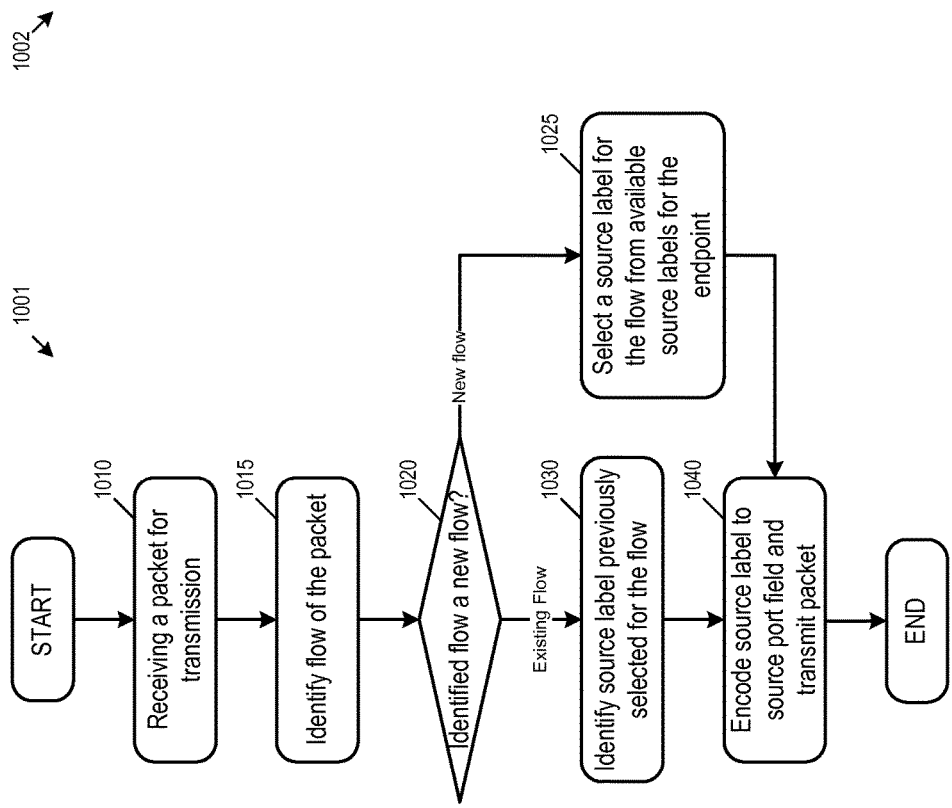
*Figure 10b*
*Figure 10a*

ENCODING CONTROL PLANE INFORMATION IN TRANSPORT PROTOCOL SOURCE PORT FIELD AND APPLICATIONS THEREOF IN NETWORK VIRTUALIZATION

CLAIM OF BENEFIT TO PRIOR APPLICATIONS

This application is a continuation of U.S. patent application Ser. No. 14/320,453, filed Jun. 30, 2014, and now published as U.S. Patent Publication 2015/0381484. U.S. patent application Ser. No. 14/320,453, now published as U.S. Patent Publication 2015/0381484 is incorporated herein by reference.

BACKGROUND

Overlay Logical Switches (or overlay logical networks) provide L2 (layer 2) connectivity to a collection of Virtual Machines (VMs) over an underlying L3 (layer 3) network. The overlay is implemented using a tunneling mechanism such as VXLAN (Virtual eXtensible Local Area Network), STT (Stateless Transport Tunneling), GENEVE (Generic Network Virtualization Encapsulation), GRE (Generic Routing Encapsulation), etc. Of these, VXLAN is gaining traction in the networking industry at this time and is being implemented in physical switches from a number of switch vendors.

Since certain applications may be hosted on physical servers, there is often a need to provide layer 2 connectivity between a number of ports/VLANs in the physical network and an overlay logical network. Handling of traffic destined to Broadcast/Unknown-unicast/Multicast (BUM) MAC addresses poses some challenges. Such traffic needs to be replicated and delivered to all virtual machines that have an interface on the overlay logical switch, and all physical machines on physical networks/VLANs being connected with the overlay logical switch.

In some network systems, the above replication functionality is offloaded—BUM traffic to be replicated is forwarded to a replication node which then replicates the traffic to all end-points that should receive the traffic. However, Reverse Path Filtering (RPF) policies in some of these systems drop packets in which the source IP address does not match the IP subnet of the interface that the packet was received on. In such network systems, the replication node modifies the source IP address in the replicated packet to its own so as to pass RPF checks in the physical network. By doing so, the context of the original sender of the BUM traffic is lost, and a receiving node cannot infer this information and hence cannot use BUM traffic to populate its Layer 2 forwarding tables.

SUMMARY

Network virtualization is implemented by a network controller over an overlay network on the physical fabric. The overlay is implemented using a tunneling mechanism such as VXLAN (Virtual eXtensible Local Area Network), STT (Stateless Transport Tunneling), GRE (Generic Routing Encapsulation), GENEVE (Generic Network Virtualization Encapsulation), etc. VXLAN and GENEVE use UDP as the transport protocol for the overlay, STT uses TCP as the transport protocol, GRE runs directly on top of IP without a transport protocol. Some embodiments encode control plane information in the source port field of the outer transport protocol header in the encapsulated packet (UDP in case of VXLAN and GENEVE, TCP in case of STT—in general any transport protocol being used for overlay tunneling).

Some embodiments provide a mapping table to the data plane hosts by the controller for mapping the encoded bits to semantically richer information. The data plane hosts can use the encoded source port bits and the mapping table to infer this semantically richer information. Some embodiments also use this information for building an L2 forwarding table. Some embodiments use this information to signal special processing to be performed on the received packet. Some embodiments use this information to convey other semantically rich information. The presence of a central controller that can convey mapping tables to all end-points allows encoding of many types of information—as long as the sending end-point is capable of encoding this information and the receiving end-point is capable of decoding the information and acting accordingly.

In some embodiments, a set of replication offload engines are used to perform BUM replication. The replicated packets from these engines to the end hosts are sent over VXLAN overlay. The VXLAN UDP source port is used to encode the original sender of the BUM traffic. A network controller publishes a mapping from the encodings to the host end-points. The receiving host in turn consults this mapping table to infer the source host from the encoded value in the VXLAN source port.

In some embodiments, the source port field of a packet encodes a source label that enables ECMP (equal cost multi-path routing) processing on the traffic. Specifically, in some embodiments, each tunnel endpoint is given a pool of available source labels, and that each flow transmitted by the tunnel endpoint encodes one of the source labels of the tunnel endpoint in the source port field. Different flows transmitted by the tunnel endpoints can be assigned different source labels such that ECMP in the physical network would be able to send flows with different source labels over different paths.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 10a conceptually illustrates a process for encoding source labels into the source port field in order to facilitate ECMP.

FIG. 10b conceptually illustrates an ECMP process that uses the source port field of a packet to select a path for forwarding the packet.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method of using the source port field in the transport or connection layer (L4) header to encode control plane information. Specifically, some embodiments encode control plane information in UDP or TCP source port field of data plane tunnels in an overlay network such as VXLAN. In some embodiments, Network virtualization is implemented by a network controller over an overlay network on the physical fabric. The network controller provides a mapping table to the data plane hosts for mapping the encoded bits in the source port field to semantically richer information. The data plane hosts in turn uses the encoded source bits and the mapping table to infer this semantically richer information. Some embodiments use multiple source-port encodings per end-point to enable ECMP (equal cost multi-path routing) in the physical network to forward different flows over different paths in the network. Some embodiments use this information to allow receivers of proxied traffic to learn the address of the original sender. Some embodiments use this information as flags to enable certain operations, such as enabling an overlay network tunnel endpoint to act as a multicast proxy.

Figure 1:
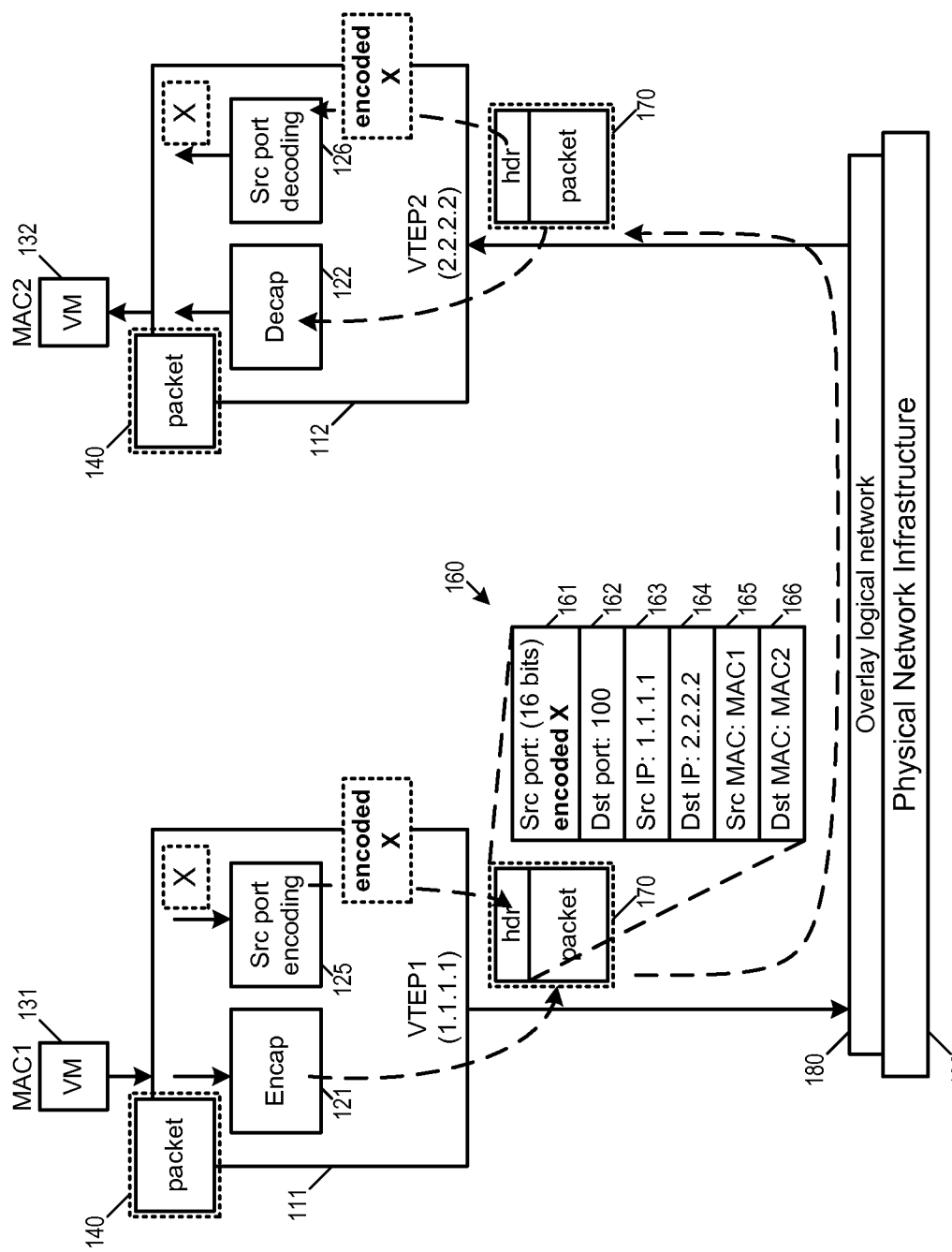
FIG. 1 illustrates using source port field in a packet header for encoding control plane information.

For some embodiments, FIG. 1 illustrates using source port field in a packet header for encoding control plane information. As illustrated, a source tunnel endpoint 111 is sending a packet 170 to a destination endpoint 112. The packet 170 is a packet encapsulated for an overlay logical network 180 that is implemented over the physical network infrastructure 190. The encapsulated packet 170 includes a source port field 161 in its header 160. The source tunnel endpoint 111 encodes control plane information "X" into the source port field 161 of the encapsulated packet 170. The destination tunnel endpoint 112 in turn decodes the information in the source port field 161 in order to obtain the control plane information "X" when it receives the packet 170.

The physical network infrastructure 190 encompasses numerous physically distinct sets of communication pathways that are communicatively interlinked. In some embodiments, at least some of these physically distinct sets of communication pathways have different topologies and/or use different communication protocols. In some embodiments, the physical network infrastructure 190 spans across one or more data centers and/or (internet service) provider networks such that at least some of the physically distinct sets of communication pathways are in the data centers or provider networks. In some embodiments, the physical network infrastructure 190 is a physical IP network (L3) that may be divided into multiple physical L2 networks, IP subnets, and multicast islands.

The physical network infrastructure 190 supports one or more overlay logical networks such as the overlay logical network 180. In some embodiments, the traffic in an overlay logical network is conducted by sending packets encapsulated under the protocols of the logical networks and tunneled between the tunnel endpoints of the logical networks. Specifically, the source endpoint 111 and the destination endpoints 112 are both tunnel endpoint of the overlay logical network 180 for which the packet 170 is encapsulated. In some embodiments, an overlay logical network spans across one or more data centers and/or (internet service) provider networks such that at least some of the physically distinct sets of communication pathways are in the data centers or provider networks. In some embodiments, an overlay logical network operates as an overlay logical switch that provides L2 connectivity to a collection of VMs over an underlying L3 network (hence the terms "logical switch" and "overlay logical network" are interchangeably used).

The endpoints 111 and 112 are tunnel endpoints of the overlay logical network 180. In some embodiments, the tunnel endpoints are implemented by virtualization software running in computing devices. The virtualization software allows these computing devices to serve as host machine for virtual machines by managing the operations of the VMs as well as their access to the computing resources and the network resources of the host machines. The virtualization software provides an interface (VM interface, or VIF) between each VM and a logical switch supported by the underlying network. Virtualization software may include one or more software components and/or layers, possibly including one or more of the software components known in the field of virtual machine technology as virtual machine monitors (VMMs), hypervisors, or virtualization kernels. Because virtualization terminology has evolved over time and has not yet become fully standardized, these terms do not always provide clear distinctions between the software layers and components to which they refer. As used herein, the term, "hypervisor" is intended to generically refer to a software layer or component logically interposed between a virtual machine and the host platform.

A host machine operating one or more VMs connected to (i.e., having link layer or L2 connectivity with) an overlay logical network or logical switch functions as a tunnel endpoint of that overlay logical network, and in the case of VXLAN tunnels this functionality is referred to as VXLAN Tunneling End Point (VTEP). In some embodiments, the VTEP functionality of a host machine is provided by its hypervisor. In some embodiments, a unique IP address is assigned to each VTEP as its tunneling IP (or VTEP-IP). A host machine running a hypervisor uses its VTEP-IP as the source IP address for tunneling logical switch traffic it receives from the VMs it hosts. The hypervisor's VTEP-IP is also used as the destination IP address when other hypervisors tunnel traffic destined to the VMs on the hypervisor. In the example of FIG. 1, the tunnel endpoints (i.e., host machines and their hypervisors) 111 and 112 have VTEP-IP addresses 1.1.1.1 and 2.2.2.2, respectively.

In some embodiments, each tunnel endpoints includes modules for processing encapsulated packet and for processing encoded source port field. In the example of FIG. 1, the tunnel endpoint 111 is the source endpoint of the packet 170 and the tunnel endpoint 112 is the destination endpoint of the packet 170. The source endpoint 111 has an encapsulation module 121 for encapsulating a raw packet 140 from a VM 131 into the encapsulated packet 170 for the overlay logical network 180. The source endpoint 111 also has source port encoding module 125 for encoding the control plane information "X" into the source port field 171 of the encapsulated packet 170. The destination endpoint 112 has a de-capsulation module 122 for decapsulating the packet 170 back into the raw packet 140. The destination endpoint 112 also has source port decoding module 126 for decoding the source port field 171 of the encapsulated packet 170 into the control plane information "X".

The encapsulated packet 170 includes a header section 160. In some embodiments, the header portion includes headers from several layers of the networking protocol, including L2, L3, and L4 layer. As illustrated, the header section includes source and destination port IDs 161-162 (L4), source and destination IP addresses 163-164 (L3), and source and destination MAC addresses 165-166 (L2). In some embodiments, a five-tuple of transport protocol, source port ID, destination port ID, source IP address, and destination IP address is used to identify a L4 transport connection session or flow.

Some embodiment is able to use the source port ID in the header for encoding control plane information because this field is not fixed to be a specific value by the encapsulation network protocol. Some embodiments are able to use the source port ID for encoding control plane information because both source and destination endpoints use the same IRNA-assigned destination port ID to identify the tunneling protocol, which allows the source port ID to be any value. In some embodiment, the overlay encapsulation protocol of the overlay logical network is a stateless protocol (e.g., there is no state in which an endpoint is in a state of waiting for a response following a request) so the source port field is not needed for keeping track of stateful exchanges between the endpoints. It is advantageous to encode information in the source port field because it is a piece of data that is visible to all hypervisors, and it is not a reserved field for other purposes by those overlay encapsulation protocols. UDP is commonly used as the transport protocol for the overlay, and some embodiments use the UDP source port to encode control plane information.

As mentioned, the control plane information stored in the source port field is encoded. This is because the source port field is limited in number of available bits—16 bits in some embodiments. A mapping is needed if one has to encode semantically richer control plane information into the source port field. Consequently, in some embodiments, a central controller of the network provides a mapping table to each of the endpoints that use the source port field to store control plane information. In other words, the encoded bits in the source port field is encoded and decoded by a mapping that is shared by both the source and destination endpoints.

Figure 2:
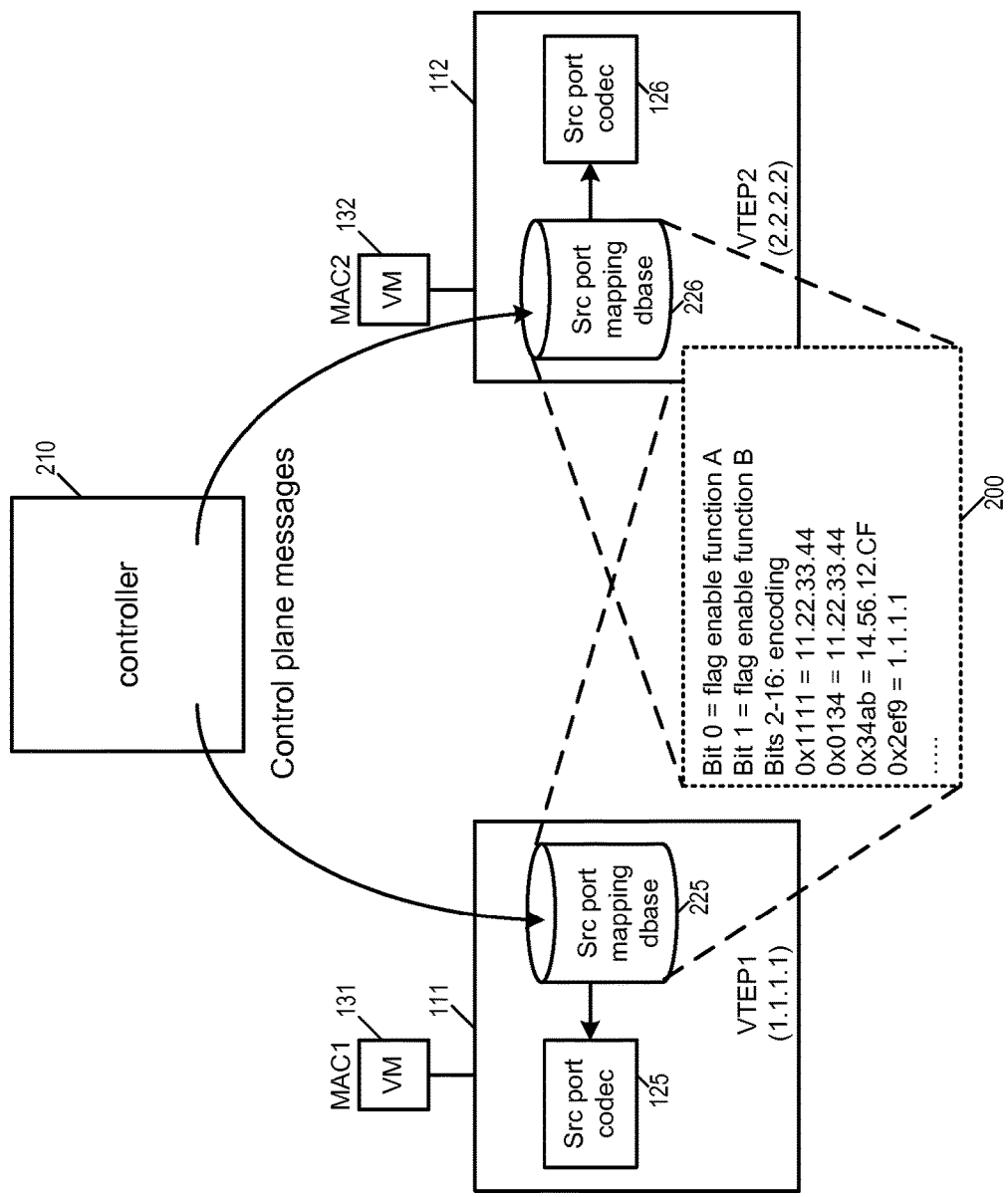
FIG. 2 illustrates a network controller providing source port mapping to endpoints that use source port field for encoding control plane information.

FIG. 2 illustrates a network controller providing source port mapping to endpoints that use source port field for encoding control plane information. Specifically, the figure illustrates a controller 210 for the network 180 that includes the endpoint 111 and 112. The controller sends control plane messages to both endpoints 111 and 112 in order to deliver a mapping table 200 needed for encoding and decoding the source port field.

As illustrated, each of the endpoints 111 and 112 stores the received mapping table 200 in its own local storage (225 and 226, respectively). For the example of FIG. 1, the source port codec 125 of the endpoint 111 uses the mapping 200 (in the storage 225) to encode into the source port field of the packet 170, while the source port codec 126 of the endpoint 112 uses the mapping 200 (in the storage 226) to decode the source port field of the packet 170.

Several more detailed embodiments of the invention are described below. Section I describes using the source port field for encoding original sender address. Section II describes using multiple source-port encodings per endpoint for enabling ECMP (equal cost multi-path routing). Section III describes an example communications device that implements some embodiments of the invention. Finally, section IV describes an electronic system with which some embodiments of the invention are implemented.

I. Encoding Original Sender

In some embodiments, the network delivers packets from its source endpoint to its destination endpoint through one or more intermediate proxy endpoints. In some embodiments, some of these proxy endpoints are required to use its own IP address as the source IP in packets that it sends out. Consequently, the source IP address field of a proxied packet, rather than carrying the IP address of the original sender, is replaced with the IP address of the proxy endpoint. To remedy this, some embodiments use the source port field to encode the IP address of the original sender such that the destination endpoint would be able to learn the true source-endpoint of the packet and forward return traffic to the VM to this source endpoint.

Figure 3:
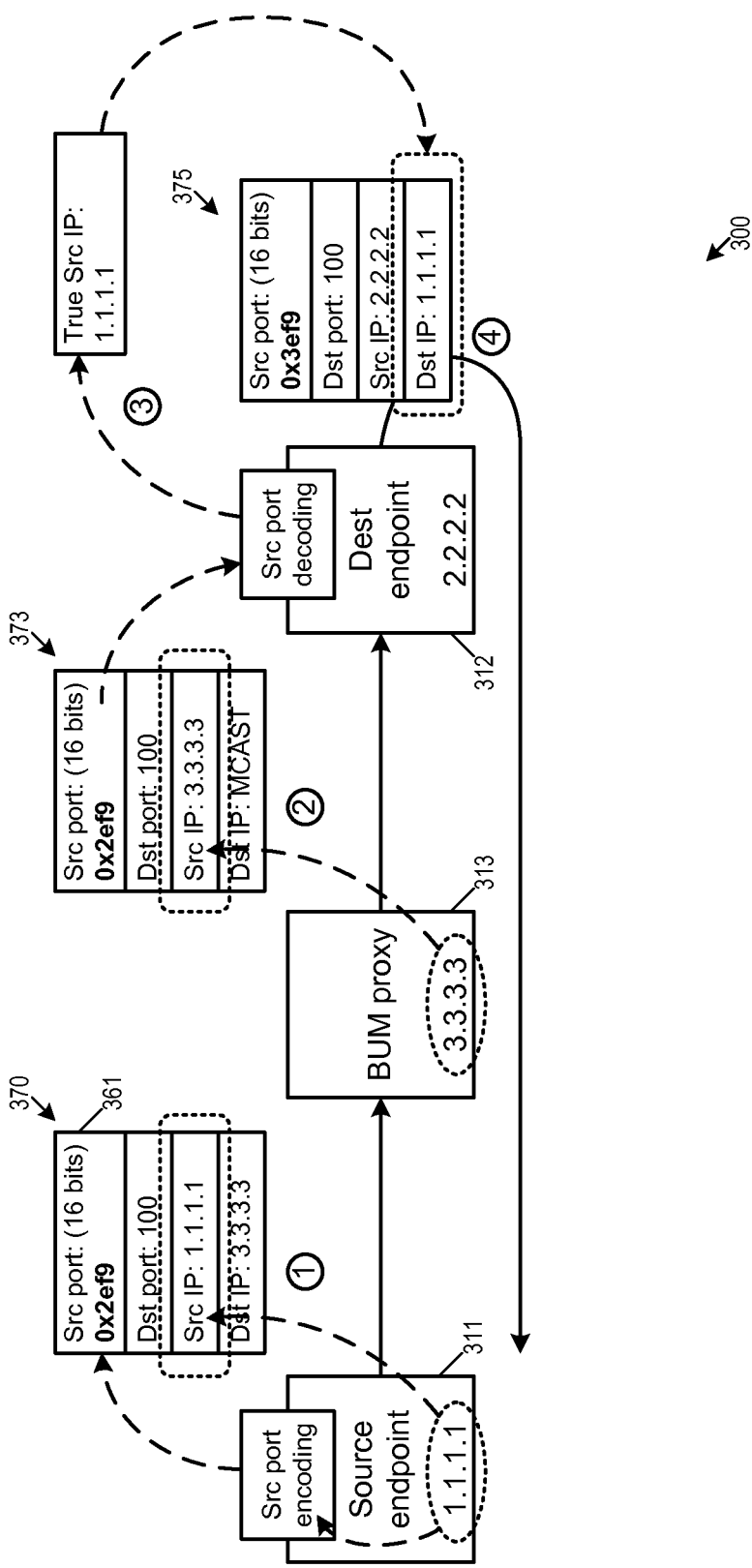
FIG. 3 conceptually illustrates using the source port field to recover the original sender's IP address when an intermediate proxy endpoint rewrites the source IP address field with its own IP address.

FIG. 3 conceptually illustrates using the source port field to recover the original sender's IP address when an intermediate proxy endpoint rewrites the source IP address field with its own IP address. FIG. 3 illustrates a network 300 in which a source tunnel endpoint 311 is sending an encapsulated packet 370 through a proxy 313, and the proxy 313 in turn delivers the packet to a destination tunneling point 312. The encapsulated packet 370 has a source port field 361 that is used to encode the IP address of the original sender. The destination endpoint would in turn use the encoded source port field to recover the original sender's IP address. FIG. 3 illustrates the use of the source port field for recovering the IP address of the original sender in three operations labeled '1' through '3'.

At operation labeled '1', the endpoint 311 generates the packet 370 and specifies its own IP address 1.1.1.1 as the source IP. Since the endpoint 311 is the origin of the packet, the endpoint 311 also encodes its own IP address into the source port field 361 (shown as hexadecimal value "0x2ef9"). The endpoint 311 also specifies the IP address 3.3.3.3 of the endpoint 313 as the destination IP address in the packet 370. The endpoint 313 is a BUM (broadcast, unknown unicast, or multicast traffic) proxy that replicates received packets to multiple recipients using IP multicast or broadcast. In other words, the source endpoint 311 forwards the packet 370 to the proxy endpoint 313 so that the proxy endpoint 313 can replicate the packet 370 to multiple recipients on the behalf of source endpoint 311.

At the operation labeled '2', the proxy endpoint 313 receives the packet 370. The proxy endpoint 313 in turn generates a replicated packet 373 using a multicast IP as destination IP. The multicast IP represents a group of tunnel endpoints, each tunnel endpoint in the group accepting the packets that uses the multicast IP as destination IP. The proxy endpoint 313 also places its own IP address "3.3.3.3" as the source IP address, overwriting the IP address of the original sender "1.1.1.1". However, the proxy endpoint 313 does not alter the source port field, leaving it to carry the encoded IP address of the original sender (shown as "0x2ef9" for encoding the IP address "1.1.1.1"). The proxy endpoint 313 then transmits the replicated packet 373 on to the network by utilizing the multicast support of the underlying physical network infrastructure.

At the operation labeled '3', the endpoint 312 receives the replicated packet 373, as it is one of the endpoints in a multicast group that recognizes the multicast IP in the destination IP field. In order to learn the IP address of the original sender, the endpoint 312 maps the encoded source port field value "0x2ef9" to IP address "1.1.1.1". Finally, at the operation labeled '4', the endpoint 312 uses the original sender IP address decoded from the source port field to create a reply packet 375. The reply packet 375 specifies "1.1.1.1" as its destination IP address, as it was the IP address of the original sender of the packet 373 (and the packet 370) as learned from the encoded source port field 361.

In some embodiments, a set of replication offload engines are used to perform BUM replication such as the proxy endpoint 313. The replicated packets from these engines to the end hosts are sent over VXLAN overlay. The VXLAN UDP source port is used to encode the original sender of the BUM traffic. The receiving end host learns the encoded sender of the traffic. In some of these embodiments, a network controller publishes a mapping for the encodings to the host end-points, and the receiving host consults this mapping table to infer the source host machine from the encoded value in the source port field of VXLAN.

Figure 4:
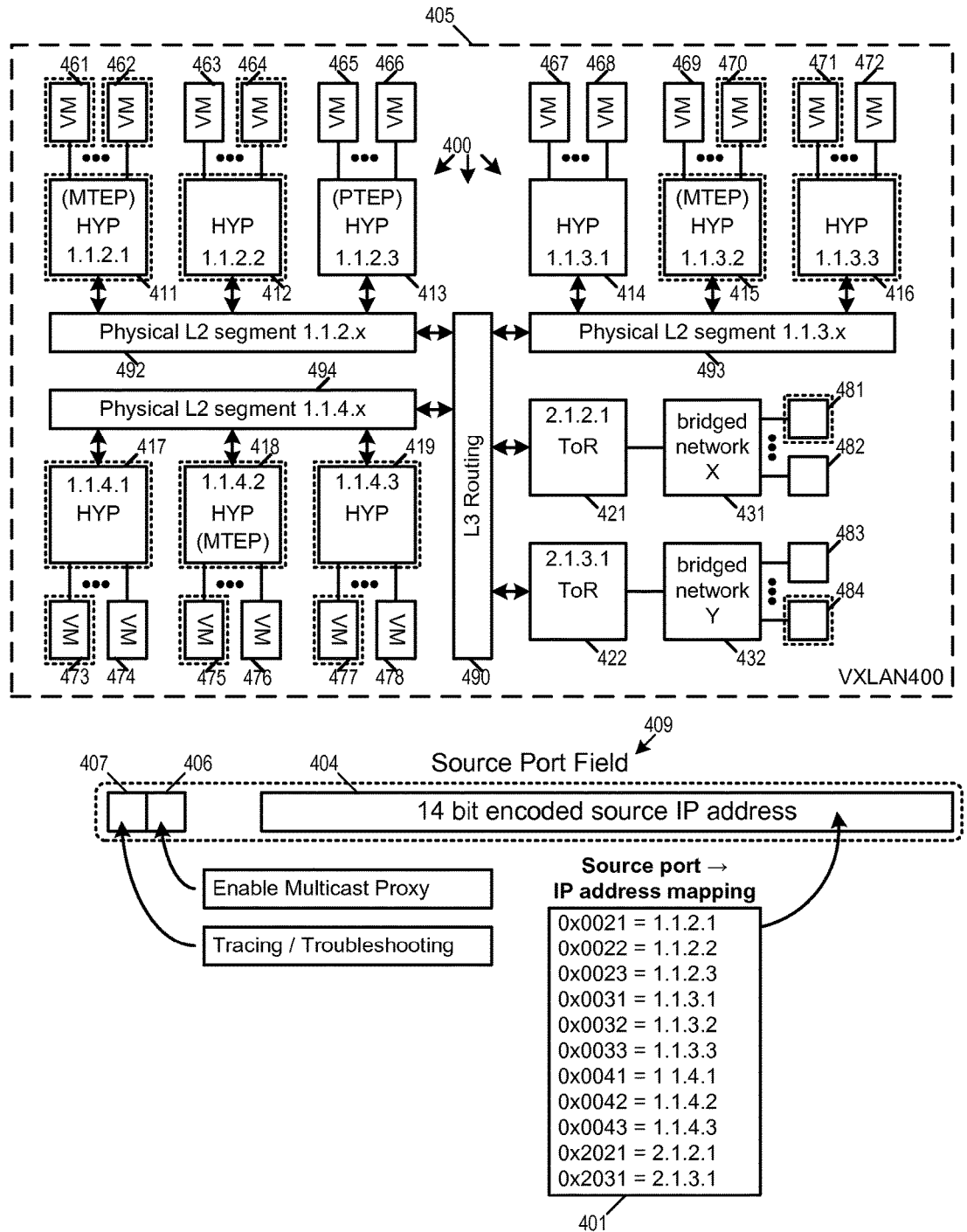
FIG. 4 illustrates a set of source port mappings for an overlay logical network.

FIG. 4 illustrates a set of source port mappings 401 for an overlay logical network 405. The overlay logical network 405 includes a set of tunnel endpoints that act as replication offload engines (or multicast proxies) for replicating BUM traffic. At least some of these multicast proxies place its own IP address as the source IP address in the replicated packets, so the receivers of the replicated packets rely on the source port mappings 401 to determine the original sender of the packet.

As illustrated, the overlay logical network 405 is implemented over a physical networking infrastructure 400. The physical networking infrastructure 400 includes several physical L2 segments 492-494 that are interconnected by a set of L3 routing elements 490. Each L2 segments interconnects a number host machines that serve as tunnel endpoints for the overlay logical network 405. The L2 segment 492 interconnects endpoints 411-413, the L2 segment 493 interconnects endpoints 414-416, and the L2 segment 494 interconnects endpoints 417-419. The physical networking infrastructure also includes several top of shelf routers (ToRs) 421 and 422. Each ToR is for bridging an external physical network into the overlay logical network 405 via the L3 routing elements 490.

Each L2 segment of the underlying physical networking infrastructure 400 has physical hardware that supports L2 multicast within the segment, but not L3 multicast between different L2 segments. Consequently, the overlay logical network designates a host machine in each L2 segment as the multicast proxy tunnel endpoint (MTEP) for handling the L2 multicast of that segment (411, 415, 418). In addition, in order to handle BUM traffic to and from the physical networks that are bridged in, a host machine (413) is designated as the physical network proxy tunnel endpoint (PTEP). These proxy endpoints receive data packets originating in the physical network from a ToR in a VXLAN tunnel and replicate the received packet as multicast or unicast to other tunnel endpoints. However, these proxies also set the source IP field of the replicated packet in the tunnel header to their own IP address. Hence, a recipient of a replicated packet from one of these proxy endpoints would have to rely on another mean (e.g., source port encoding) to find out the identity (i.e., the IP address) of the original sender.

In order to use the port field to encode the IP address of the original sender, the controller of the overlay logical network provides a mapping table from bits encoded in the source port field to IP address. This mapping table (i.e., the source port mappings 401) is provided to each possible recipient in the network. The mapping table 401 in turn includes an entry for each possible sender in the network. In the example of FIG. 4, there are 11 tunnel endpoints that may originate packets in the physical network infrastructure 400 (the endpoints 411-419 and the ToRs 421 and 422.) The IP address of each of these tunnel endpoints has a corresponding entry in the source port mapping table 401. For example, the tunnel endpoint 411 has an IP address 1.1.2.1 that is mapped to a hexadecimal code "0x0021", while the ToR 422 has an IP address 2.1.3.1 that is mapped to a hexadecimal code "0x2031". One of ordinary skill would understand these encoded values are chosen for illustrative purposes only.

In some embodiments, not all bits in the source port field are used for encoding the IP address of original sender. As illustrated, the source port field 409 in encapsulated packets of the overlay logical network 405 (VXLAN 400) has 16 bits, out of which only 14 bits are used to encode original source IP address in an original source IP field 402. The remaining two bits are used to encode flags for enabling/disabling other functionalities. Specifically, the source port field 409 includes a flag bit 406 for enabling multicast proxy functionality and a flag bit 407 for tracing and trouble shooting. In some embodiments, the bit for enabling multicast proxy informs the receiving tunnel endpoint to behave as a multicast proxy and replicate the received packet, rather than merely accepting the packet as an ordinary tunnel endpoint.

Figure 5:
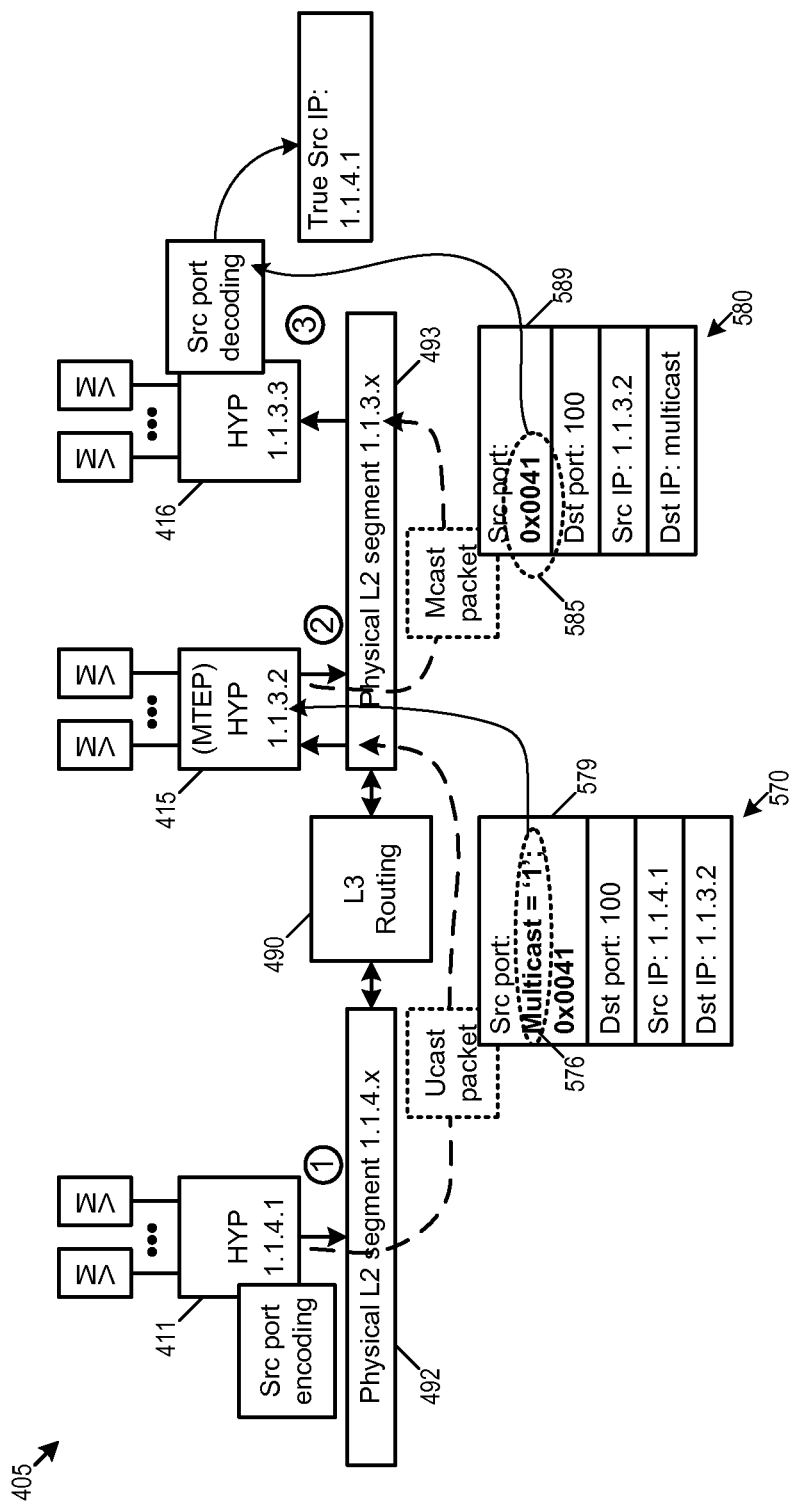
FIG. 5 illustrates the use of source port field for enabling multicast proxying as well as for encoding original sender IP address.

FIG. 5 illustrates the use of source port field for enabling multicast proxying as well as for encoding original sender IP address. Specifically, the figure illustrates a packet 570 with a flag bit 576 in its source port field 579 being used to activate multicast proxy operations in the MTEP 415 and for recovering the IP address of the original sender. The figure illustrates the transmission of the packet 570 from its source endpoint 411 through the MTEP 415 and reaches destination endpoint 416 in three stages labeled '1' through '3'.

At the operation labeled '1', the tunnel endpoint 411 produces the packet 570. Knowing that it is the origin of the packet (e.g., the packet originated from one of its VMs), the tunnel endpoint 411 encodes its own IP address into the source port field 579 of the packet 570. The encoding is done based on the source port mapping 401 of FIG. 4, which maps IP addresses 1.1.4.1 of the endpoint 411 into a corresponding encoding "0x0041 in the source port field 409. The tunnel endpoint also intended this packet to be broadcasted to a multicast group, so it sets a multicast enable flag 576 of the source port field 579 to '1'. The destination of the packet 570 is set to 1.1.3.2, which is the IP address of the designated multicast proxy endpoint 415 (MTEP) for the physical L2 segment 493.

At the operation labeled '2', the tunnel endpoint 415 receives the packet 570 through L3 routing 490. As a designated MTEP, the tunnel endpoint 415 examines the packet for indication for whether it should perform BUM replication. Specifically the endpoint 415 examines the multicast enable flag 576 in the source port field 579 of the received packet 570. Since multicast enable flag is set to '1', the endpoint 415 would act as the multicast proxy and replicates the packet 570 to other endpoints in the physical L2 segment 493, including the endpoint 416.

The replicated packet 580 (based on the packet 570) has a multicast IP address as its destination IP and the IP address of the MTEP 415 "1.1.3.2" as its source IP. In other words, the IP address of the original sender (i.e., IP address 1.1.4.1 of the endpoint 411) has been replaced by the MTEP 415. However, since MTEP 415 knows that it is not the originator of the packet, it will not encode its own IP address into the source port field (589) of the replicated packet 580. Consequently, the source port field 589 is still encoding the IP of the original sender (shown as hexadecimal value 0x0041). However, the replicated packet 580 does not set its multicast enable flag in its source port field 589 as the replicated packet 580 does not need to be replicated.

At the operation labeled '3', the tunnel endpoint 416 as an endpoint in the L2 physical segment 493 receives the replicated packet 580. The tunnel endpoint 416 uses the encoded value (0x0041) in the source port field 589 of the packet 580 to reconstruct the IP address of the original sender, which is "1.1.4.1" of the endpoint 411. The reconstruction is also based on source port mapping 401 of FIG. 4.

FIG. 5 illustrates using the source port field to recover the original sender IP when a multicast proxy (MTEP) inserts its own IP as the source IP of the replicated packet. In some embodiments, other types of proxy endpoints such as the PTEP also inserts its own IP address as the source IP in the replicated packets that it produces. In some of these embodiments, the source port field encoding is likewise used to preserve the original sender IP. Furthermore, in some embodiments, source port field is used to preserve original sender IP through two or more proxy intermediaries such as MTEPs and/or PTEPs. For some embodiments, FIG. 6 illustrates using source port field to preserve original sender IP through multiple proxies or intermediaries that rewrite the source IP field.

Figure 6:
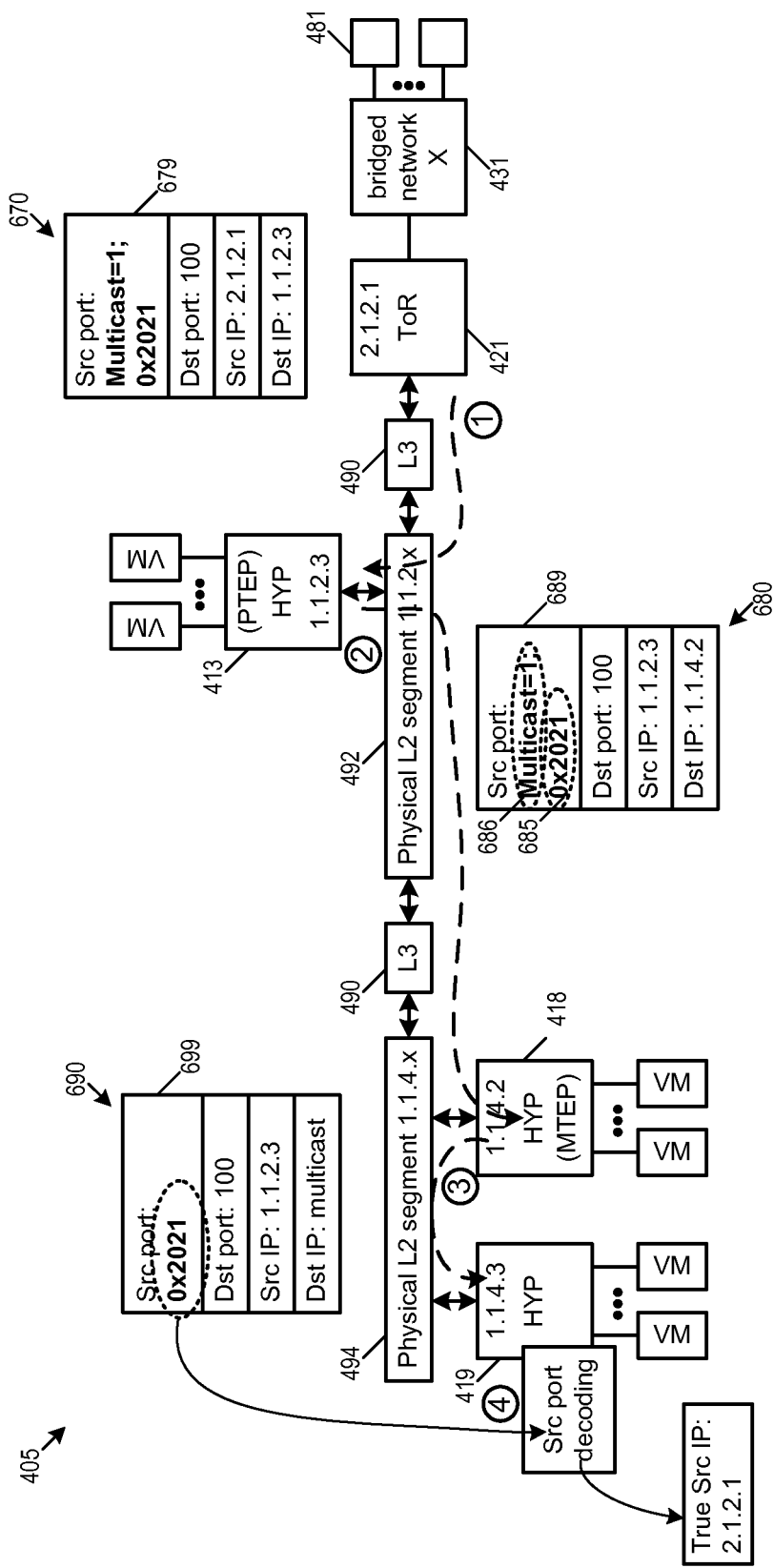
FIG. 6 illustrates using source port field to preserve original sender IP through multiple proxies or intermediaries that rewrite the source IP field.

FIG. 6 illustrates the BUM replication of a packet 670 that originates from a network node 481 in a physical network 431 that is bridged into the overlay logical network 405 by the ToR 421. The ToR 421 forwards the packet 670 to the PTEP 413, which in turn forwards the packet to the MTEP 418. The MTEP 418 in turn replicates the packet as multicast to tunnel endpoints on the L2 physical segment 494. The PTEP 413 and the MTEP 418 fill the source IP address field of forwarded or replicated packets with their own IP addresses. In some embodiments, the MTEP 418 preserves the source IP address since the packet is now only forwarded on the local L2 segment and L3 RPF does not apply. However, in some embodiments, the network stack on the MTEP 418 may not allow sending traffic with a source IP that does not belong to the endpoint and the source IP address has to be replaced in the MTEP for this purpose. In either case, the original sender IP address is lost and therefore the receiving tunnel endpoint of the packet would not be able to learn the IP address of the original sender from the source IP field.

The figure illustrates the forwarding and the replicating of the packet 670 in four operations labeled '1', '2', '3', and '4'. At the operation labeled '1', a network node 481 in the physical network 481 produces the packet 670, and the ToR 421 then bridges the packet 670 into the logical network 405 by e.g., encapsulating the packet 670 according to the requirement of the overlay logical network 405. The ToR 421 serves as the bridge between the physical network 431 and the overlay logical network 405. In some embodiments, at least some of the ToR switches are incapable of subscribing to multicast groups and therefore unable to receive BUM traffic as members of a multicast group. Some embodiments choose one or more tunnel endpoints participating in the overlay as Physical-network Tunneling End Points (PTEPs) for handling BUM traffic on behalf of ToRs. These PTEPs serve as candidate intermediate destination tunnel endpoints for BUM traffic from ToRs. For such a ToR to send BUM traffic onto a particular overlay logical network, it tunnels the BUM packet to one of these PTEPs using unicast and then let the PTEP replicate the BUM packet to all endpoints with VMs connected to the particular logical switch using IP multicast, or sending unicast copies to one MTEP per L2 segment. Further descriptions of MTEP, PTEP and ToRs can be found in U.S. patent application Ser. No. 14/231,245 titled "Replicating Broadcast, Unknown-Unicast, and Multicast Traffic in Overlay Logical Networks Bridged with Physical Networks", filed on Mar. 31, 2014, and now issued as U.S. Pat. No. 9,794,079. U.S. patent application Ser. No. 14/231,245, now issued as U.S. Pat. No. 9,794,079, is hereby incorporated by reference.

In the example of FIG. 6, the ToR 421 forwards the packet 670 to the PTEP 413 by specifying the its own IP address as the source IP address (2.1.2.1) and the IP address of the PTEP 413 as the destination IP address (1.1.2.3). In some embodiments, the ToRs are capable of using the source port field for encoding the original sender IP address. For some of these embodiments, the ToR 421 encodes its own IP address (1.1.2.3) into the source port field 679 of the packet 670 (shown as hexadecimal value 0x2021 according to the source port mapping table 401.) However, in some embodiments, at least some of the ToRs are incapable of using the source port field for encoding control plane information and therefore would not encode its own IP address into the source port field 679 as the original sender IP address (not illustrated). In some embodiments, the IP address "2.1.2.1" of the ToR 421 is used as the original sender IP address instead the IP address of the network node 481, because the ToR 421 is a tunnel endpoint of the overlay logical network 405 that can receive tunneling traffic, while the network node 481 is not.

At the operation labeled '2', the PTEP 413 receives the packet 670 from the ToR 421 and forward the packet to the MTEP 418. The forwarded packet 680 specifies the IP address of the MTEP 418 (1.1.4.2) as destination IP address. The forwarded packet 680 also specifies the IP address of the PTEP 413 itself (1.1.2.3) as the source IP of the packet. In other words, the IP address of the original sender (i.e., IP address 2.1.2.1 of the ToR 421) has been replaced. However, since the PTEP 413 knows that it is not the originator of the packet, it will not encode its own IP address into the source port field (689) of the forwarded packet 680.

The source port field 689 of the forwarded packet sets a multicast enable flag 686 to enable multicast proxy operation. The source port field 689 also includes the encoding for the original sender IP address (685). In some embodiments in which ToRs are capable of using the source port field for encoding original sender IP, the source port field 689 of the forwarded packet 680 maintains the original sender IP encoding from the ToR 421. In some embodiments in which at least some of the ToRs are incapable of using the source port field, the PTEP 413 encodes the source IP address (2.1.2.1 of the ToR 421) embedded in the packet 670 into the source port field as the original sender IP. In other words, the PTEP 413, being the multicast intermediary for the ToR 421, encodes the IP address of the ToR 421 into the source port field 689 on behalf of the ToR 421. This encoding is also based on the source port mapping 401, which encodes the IP address of the ToR 421 "2.1.2.1" as hexadecimal value "0x2021".

At the operation labeled '3', the tunnel endpoint 418 receives the forwarded packet 680 through L3 routing 490. As a designated MTEP, the tunnel endpoint 418 examines the packet for indication for whether it should perform BUM replication. Specifically the endpoint 418 examines the multicast enable flag 686 in the source port field 689 of the received packet 680. Since multicast enable flag 686 is set to '1', the endpoint 418 act as the multicast proxy and replicates the packet 680 to other endpoints in the physical L2 segment 494, including the endpoint 419.

In some embodiments, unlike the PTEP, the MTEP can preserve the source IP in the replicated packet since the packet is now only to be forwarded over the local L2 segment and hence RPF checks on the source IP do not apply. However, in some embodiments, the network stack on the MTEP may not allow sending traffic with a source IP that does not belong to the end-point and the source IP address has to be replaced in the MTEP for this purpose. In any case, the original source IP is lost going through the PTEP. The replicated packet 690 (based on the packet 680) has a multicast IP address as its destination IP and the IP address of the MTEP 418 "1.1.4.2" as its source IP. In other words, not only the IP address of the original sender (i.e., IP address 1.1.4.1 of the ToR 421) is replaced, even its replacement (i.e., the IP address 1.1.2.3 of the PTEP 413) has been replaced. However, since the MTEP 418 knows that it is not the originator of the packet, it will not encode its own IP address into the source port field (699) of the replicated packet 690. Consequently, the source port field 699 is still encoding the IP of the original sender (shown as hexadecimal value 0x2021). However, the replicated packet 690 does not have multicast enable flag set in its source port field 699 as the replicated packet 690 needs to be replicated.

At the operation labeled '4', the tunnel endpoint 419 as an endpoint in the L2 physical segment 494 receives the replicated packet 690. The tunnel endpoint 419 uses the encoded value in the source port field 699 of the replicated packet 690 to reconstruct the IP address of the original sender, which is "2.1.2.1" of the ToR 421. The reconstruction is also based on source port mapping 401 of FIG. 4. The tunnel endpoint 419 can then use the reconstructed IP address as destination IP to tunnel return traffic to the ToR 421 in the overlay logical network 405.

Figure 7:
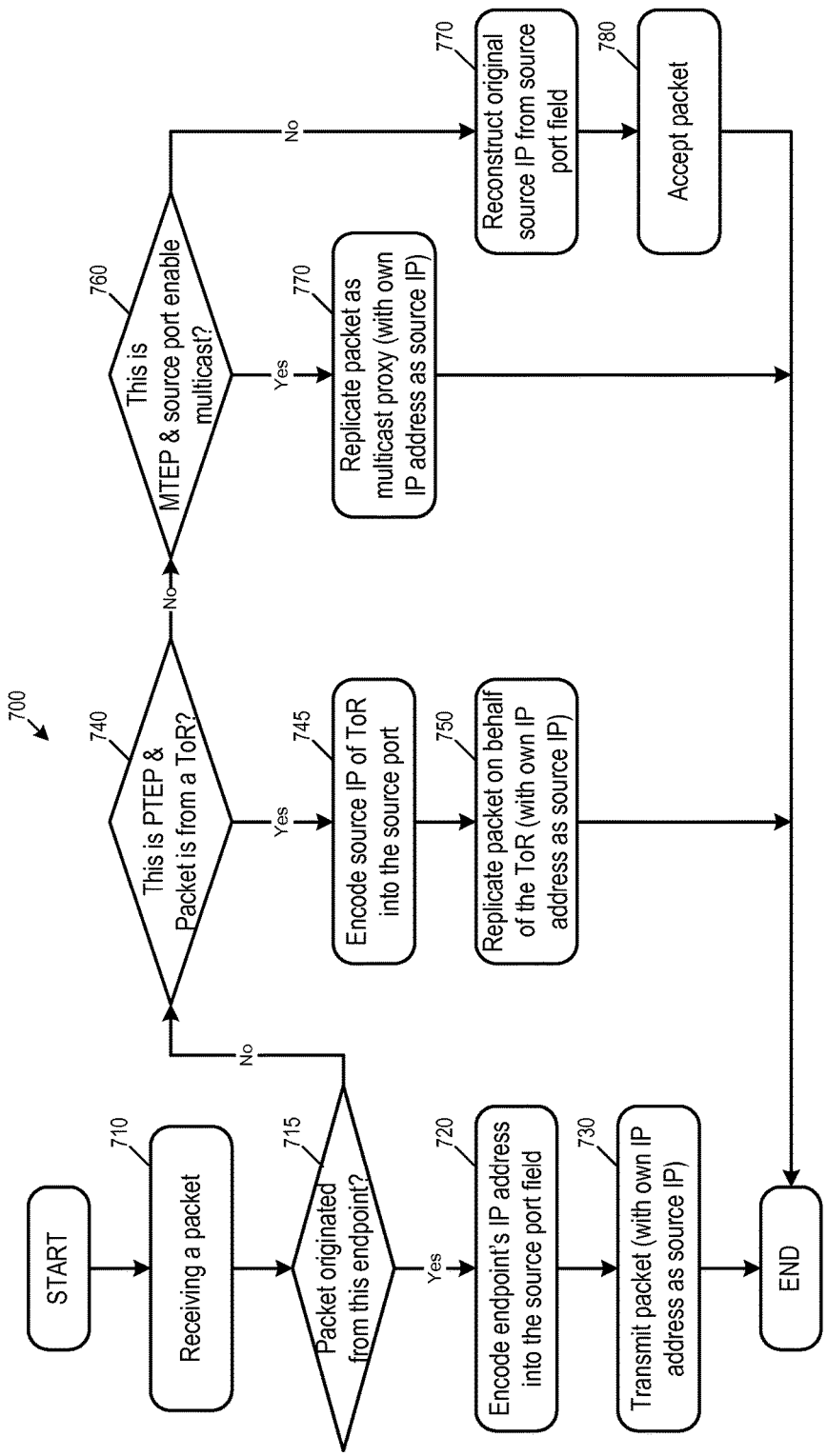
FIG. 7 conceptually illustrates a process performed by a tunnel endpoint that uses the source port field of a encapsulated packet for encoding, preserving, and recovering the identity of the original sender of packet.

For some embodiments, FIG. 7 conceptually illustrates a process 700 performed by a tunnel endpoint (i.e., the virtualization software of a host machine that serve as the tunnel endpoint in an overlay logical network) that uses the source port field of a encapsulated packet for encoding, preserving, and recovering the identity of the original sender of packet (i.e., the original sender IP). The process 700 starts when it receives (710) a packet for transmission. Such a packet can be received from a VM that is being hosted by the tunnel endpoint host machine, or the packet can be received from another tunnel endpoint over the network.

Next, the process determines (at 715) if the received packet originates from this tunnel endpoint and is for transmission to other tunnel endpoints, e.g., if the packet originate from a VM that is being hosted by this host machine. If so, the process proceeds to 720. If the packet is received from another tunnel endpoint over the network, the process proceeds 740.

At 720, the process has determined that this tunnel endpoint is the original sender. It therefore encodes its own IP address into the source port field according to a mapping table for the source port field. Such as mapping table is provided by a central controller of the network in some embodiments. The process then proceeds to 730 to transmit the packet to its destination. The process in some embodiments also writes the tunnel endpoint's own IP address as the source IP of the packet. The process 700 then ends.

The process determines (at 740) if this tunnel endpoint is a PTEP and if the packet is from a ToR. In some embodiments, the process is able to determine if a packet is from a ToR by examining the source IP address of the incoming packet with a list of ToRs provided by the central network controller. If this tunnel endpoint is a designated PTEP and the incoming packet does come from a ToR, the tunnel point would handle BUM packet forwarding on behalf of the ToR as a PTEP and the process proceeds to 745. Otherwise, the tunneling endpoint does not behave as a PTEP and the process proceeds to 760.

At 745, the process has determined that the packet is from a ToR and that this tunnel endpoint is a PTEP. The process in some embodiments then encodes the source IP address of the incoming packet into the source port field as the IP address of the original sender. This encoded original sender IP address belongs to the ToR, which in some embodiments does not utilize the source port field for encoding original sender IP address. The process then replicate (750) the incoming packet as a PTEP on behalf of the ToR (by e.g., replicating the packet to multiple tunnel endpoints using multicast, by replicating the packet to one or more multicast proxies using unicast, by replicating the packet to other ToRs, etc.). In some embodiments, the process also overrides the source IP field (not the source port field) with the tunnel endpoint's own IP address. The process 700 then ends.

At 760, the process determines if this tunnel endpoint is a MTEP and if the packet source port field enables multicast by e.g., setting a multicast enable flag. If the tunnel endpoint is not a MTEP or if the source port field does not enable multicast operations, the process proceeds to 770. If the tunnel endpoint is MTEP and the source field does enable multicast, the process act as a multicast proxy and replicates (at 765) the packet to tunnel endpoints belonging to the multicast group (e.g., by using L2 multicast). In some embodiments, the process also overrides the source IP field (not the source port field) with the tunnel endpoint's own IP address. The process 700 then ends.

At 770, the process has determined that the tunnel endpoint does not need to replicate the packet as either a MTEP or a PTEP. The process then uses the source port field to reconstruct the original sender IP by using the source port field mapping. The process 700 then accepts (at 780) the packet and ends. In some embodiments, the reconstructed original sender IP is subsequently used to produce a packet destined to the original sender of the packet.

II. Enabling ECMP

All packets received from a VM, having the same inner source and destination MAC address, inner source and destination IP address and inner L4 source and destination ports constitute a flow. Using the same source port in all traffic originating at a hypervisor will mean that all traffic from this hypervisor to another hypervisor will take the same L3 path in the underlay even if there are multiple equal-cost paths. This is because the underlay typically uses source IP, destination IP, L4 source-port, L4 destination-port to identify a flow and route it on the same path in order to guarantee in-order delivery of packets in a flow.

Section I above describes using source port field for encoding the identity of the original sender of the packet. In some embodiments, the source port field of a packet encodes a source label that enables ECMP (equal cost multi-path routing) processing on the packet. Specifically, in some embodiments, each tunnel endpoint is given a pool of available source labels, and that each packet transmitted by the tunnel endpoint encodes one of the source labels of the tunnel endpoint in the source port field. Different flows transmitted by the tunnel endpoints can be assigned different source labels such that an ECMP process in the underlay would forward the flows over different equal cost paths.

Figure 8:
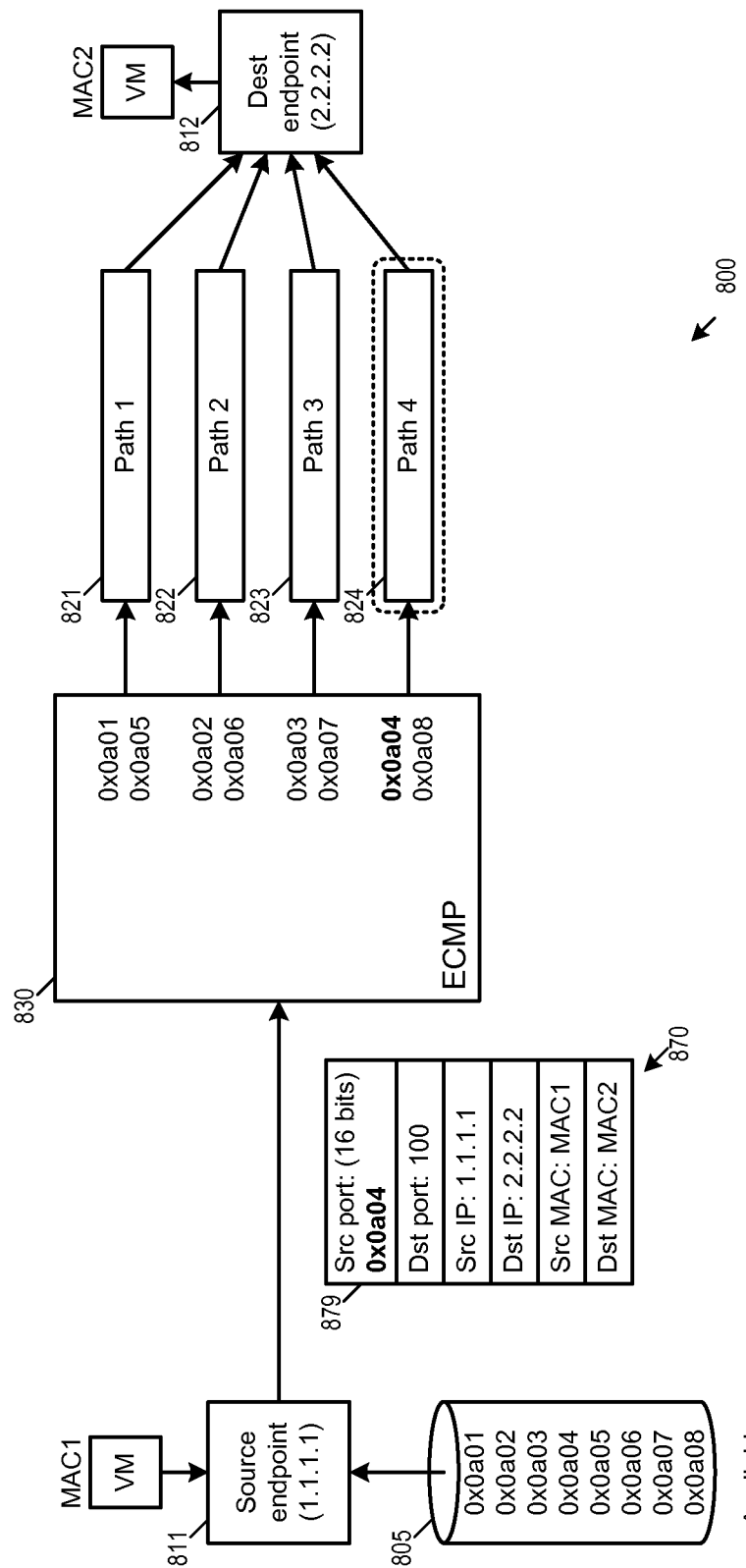
FIG. 8 conceptually illustrates an ECMP process that uses the source label in the source port field of a packet in determining a next hop for the packet.

In some embodiments, FIG. 8 conceptually illustrates an ECMP process that uses the source label in the source port field of a packet in determining a next hop for the packet. The figure illustrates a network system 800 in which a source tunnel endpoint 811 is sending packets to a destination tunnel endpoints 812. The network 800 has several different paths 821-824 by which packets transmitted by the source endpoint 811 may use to reach the destination endpoint 812. The figure also conceptually illustrates an ECMP module 830 that decides which of the paths 821-824 should a packet from the source endpoint take based on the source port field encoding of the packet.

The source endpoint 811 is assigned a set of source labels 805 (hexadecimal values "0x0a01" through "0x0a08"). For each flow transmitted, the source endpoint 811 selects a source label from the set 805 to encode into source port field of packets of the flow. As illustrated, the source endpoint 811 is transmitting a packet 870, and the source endpoint 811 has selected the source label "0x0a04" to encode into the source port field 879 of the packet.

In some embodiments, the ECMP module 830 is a software module running on the source tunnel endpoint 811 (i.e., as a software module in the virtualization software of the host machine). In some embodiments, the ECMP module is a process running on another node (e.g., a physical switch, or a physical router, or another host machine) in the network 811 that will decide which path a packet (from the source endpoint 811 or other network nodes) should take.

In the example illustrated by FIG. 8, the ECMP 830 has decided that the packets with source labels "0x0a01" and "0x0a05" would be assigned to path 821, the packets with source labels "0x0a02" and "0x0a06" would be assigned to path 822, the packets with source labels "0x0a03" and "0x0a07" would be assigned to path 823, and the packets with source labels "0x0a04" and "0x0a08" would be assigned to path 824.

In some embodiments, this assignment is determined by a hash based on identifiers of the packet that would be the same in all packets sent on an application session, viz. source/destination MAC address, VLAN ID, source/destination IP, source/destination L4 ports. In some embodiments, packets with different source labels may be assigned to a same path. In the example of FIG. 8, the ECMP module 830 has four paths 821-824 to choose from when assigning at least eight possible labels ("0x0a01" to "0xa08"). Assuming perfect hashing on these flows, each path assigned two flows. One of ordinary skill would understand that there is expected to be some non-uniformity in hashing flows to paths, especially when the number of flows is small and comparable to the number of distinct paths.

In some embodiments, the ECMP module 830 always assigns packets with the same source label to the same path. In some embodiments, packets belonging to a L4 transport connection flow must take the same path in order to preserve order. Consequently, in some of these embodiments, the source endpoint 811 would assign a same source label to packets belonging to the same flow in order to ensure that the packets of those flow be assigned the same path by the ECMP 830.

In some embodiments, each tunnel endpoint in the network is assigned a different set source labels. In some embodiments, this allows network nodes in the system (such as the network node running the ECMP module 830) to be able to use the source label in the source port field to distinguish packets from different tunnel endpoints. Consequently, the number of source labels that is available for use by a tunnel endpoint (i.e., assigned to the tunnel endpoint) is determined by the number of tunnel endpoints in the system and by the total number of possible source port encodings.

Figure 9:
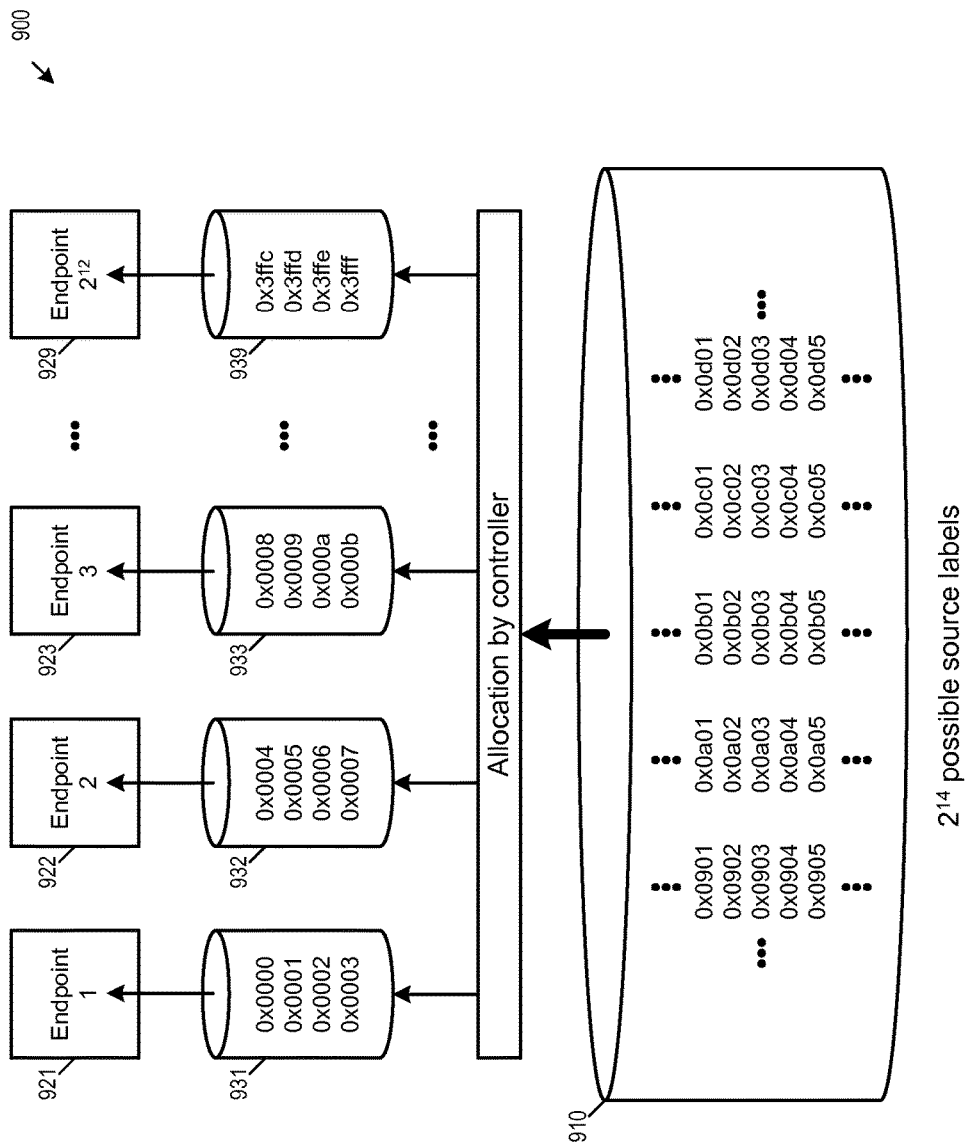
FIG. 9 illustrates the assignment of source labels to different tunnel endpoints in a network.

FIG. 9 illustrates the assignment of source labels to different tunnel endpoints in a network 900. The network 900 has $2^{12}$=4096 different tunnel endpoints, including tunnel endpoints 921-929. The source port field has 16 bits, 2 of the bits are assigned as flags for other purposes, leaving 14 bits for encoding source labels. In other words, there can be a total of $2^{14}$=16,384 different possible source labels. Consequently, each tunnel endpoint is allotted 4 source labels for use in the source port field for facilitating ECMP.

As illustrated, the total pool 910 of possible source labels has 16,384 labels. These 16,384 are divided into 4096 different allotments (including allotments 931-939) that are respectively assigned to 4096 tunnel endpoints (including tunnel endpoints 921-929). Each allotment includes a set of source labels that are not assigned to any other tunnel endpoints. In some embodiments, this assignment is performed by a central network controller, and each tunnel endpoint is provided in the list of available source labels to use by the central network controller.

FIG. 10a conceptually illustrates a process 1001 for encoding source labels into the source port field in order to facilitate ECMP. The process is performed by a tunnel endpoint (such as the source endpoint 910) when encapsulating a packet for transmission in an overlay logical network. The process 1001 starts when the tunnel endpoint receives (at 1010) a packet for transmission in an overlay logical network. In some embodiments in which the tunnel endpoint is implemented by the virtualization software of a host machine of VMs, the packet can be received from a VM.

Next, the process identifies (at 1015) the L4 transport connection flow that the received packet belongs to. In some embodiments, this identification is based on the tuple of source and destination MAC addresses, VLAN ID, source and destination IP addresses, and source and destination L4 ports, which are in the header sections of the packet received from a VM (inner header). In some embodiments, the source port is not used as identifier for a flow because it is being used for encoding control plane information (such as the source label).

The process then determines (at 1020) whether the identified flow that the packet belongs to is a new flow (e.g., the received packet is the first packet of the flow). If the identified flow is a new flow, the process proceeds to 1025. If the identified flow is an existing flow, the process proceeds to 1030.

At 1025, the process selects a source label for the identified new flow from the available source labels that have been assigned to the tunnel endpoint. In some embodiments, the process selects a source label for the newly identified flow based on random selection. In some embodiments, source labels are selected by other criteria, such as by round-robin or by hashing. After selecting the source label, the process proceeds to 1040.

At 1030, the process identifies the source label that has been previously selected for the existing flow. This is done in order to avoid assigning different source labels to packets belonging to the same flow, i.e., to ensure that packets belong to a same flow is always assigned to a same path by ECMP so they can arrive at their destination in order. After identifying the source label for the flow, the process proceeds to 1040.

At 1040, the process encodes the source label to the source field so the ECMP process may use the source port field to decide which path to use when forwarding the packet. The process 1001 then ends.

FIG. 10*b* conceptually illustrates an ECMP process 1002 that uses the source port field of a packet to select a path for forwarding the packet. In some embodiments, the process 1002 is performed by an ECMP module such as 830 of FIG. 8.

The process starts when it receives (at 1050) a packet for forwarding to the next hop. The process then selects (at 1060) a next hop based on the source label in the source port field. For example, some embodiments selects the next hop based on a tuple of parameters that include source and destination MAC, VLAN ID, source and destination IP, source and destination L4 ports. The process then forwards (at 1070) the packet to the selected next hop and ends.

III. Computing Device

Figure 11:
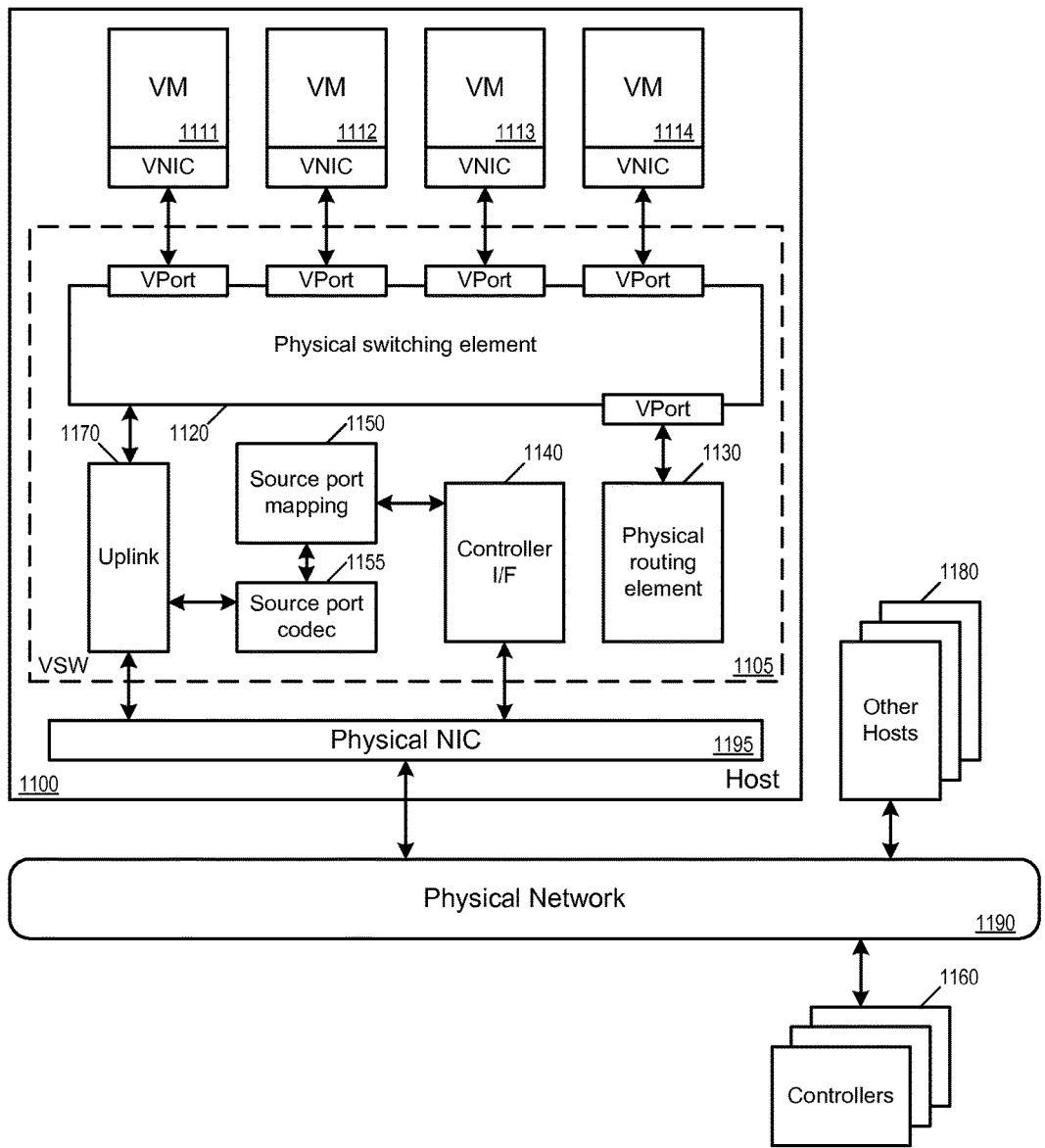
FIG. 11 illustrates an example host machine that is operating virtualization software.

As mentioned earlier, some embodiments of the invention are implemented by virtualization software or hypervisors running on computing devices serving as host machines. For some embodiments, FIG. 11 illustrates an example host machine 1100 that is operating virtualization software 1105. The virtualization software 1105 allows the host machine to host virtual machines 1111-1114 as well as connecting the virtual machines to a physical network 1190. This physical network 1190 may span one or more data centers and include various physical switches and routers.

As illustrated, the host machine 1100 has access to the physical network 1190 through a physical NIC (PNIC) 1195. The virtualization software 1105 serves as the interface between the hosted VMs 1111-1114 and the physical NIC 1195 (as well as other physical resources, such as processors and memory). Each of the VMs includes a virtual NIC (VNIC) for accessing the network through the virtualization software 1105. Each VNIC in a VM is responsible for exchanging packets between the VM and the virtualization software 1105. In some embodiments, the VNICs are software abstractions of physical NICs implemented by virtual NIC emulators.

The virtualization software 1105 manages the operations of the VMs 1111-1114, and includes several components for managing the access of the VMs to the physical network (by implementing the logical networks to which the VMs connect, in some embodiments). As illustrated, the virtualization software 1105 includes a physical switching element 1120, a physical routing element 1130, a controller interface 1140, an uplink module 1170, a source port mapping table 1150, and a source port codec 1155.

The controller interface 1140 receives control plane messages from a controller or a cluster of controllers 1160. In some embodiments, these control plane message includes configuration data for configuring the various components of the virtualization software and/or the virtual machines (such as the physical switching element 1120 and the physical routing element 1130). In some embodiments, the control plane messages also include information for mapping encoded bits in the source port field into control plane information. In some embodiments, the information provided by the controller includes a mapping table for mapping encoded source port field to original sender identity (e.g., the IP address of the original sender). In some embodiments, such information includes a list of available source labels that the host machine may encode into the source port field for purpose of facilitating ECMP.

The source port mapping module 1150 is for storing information necessary for using the source port field. In some embodiments, the source port mapping module 1150 stores the mapping table for mapping encoded source port field to original sender identity. In some embodiments, the source port mapping module 1150 stores the list of available source labels that the host machine may encode into the source port field.

The source port codec 1155 is for encoding information into the source port field of outgoing packets and for decoding information from the source port field of incoming packets. The encoding and the decoding of the source port field are based on the information stored in the source port mapping module 1150. In some embodiments, the source port codec 1155 injects source port field encoding into the uplink module 1170 as the uplink module is encapsulating packets for the physical network. The source port codec 1155 also monitors the uplink module for incoming packets for encoded source port fields.

The physical switching element 1120 delivers network data to and from the physical NIC 1195, which interfaces the physical network 1190. The physical switching element also includes a number of virtual ports (vPorts) that communicatively interconnects the physical NIC with the VMs 1111-1114, the physical routing element 1130 and the controller interface 1140. Each virtual port is associated with a unique L2 MAC address, in some embodiments. The physical switching element performs L2 link layer packet forwarding between any two network elements that are connected to its virtual ports. The physical switching element also performs L2 link layer packet forwarding between any network element connected to any one of its virtual ports and a reachable L2 network element on the physical network 1190 (e.g., another VM running on another host).

The physical routing element 1130 performs L3 routing (e.g., by performing L3 IP address to L2 MAC address resolution) on data packets received from a virtual port on the physical switching element 1120. Each routed data packet is then sent back to the physical switching element 1120 to be forwarded to its destination according to the resolved L2 MAC address. This destination can be another VM connected to a virtual port on the physical switching element 1120, or a reachable L2 network element on the physical network 1190 (e.g., another VM running on another host, a physical non-virtualized machine, etc.).

The uplink module 1170 relays data between the physical switching element 1120 and the physical NIC 1195. In some embodiments, the uplink module 1170 allows the host machine 1100 to serve as a tunnel endpoint for encapsulation overlay networks such as VXLAN and VLANs. VXLAN is an overlay network encapsulation protocol. An overlay network created by VXLAN encapsulation is sometimes referred to as a VXLAN network, or simply VXLAN. When a VM on the host 1100 sends a data packet (e.g., an ethernet frame) to another VM in the same VXLAN network but on a different host, the uplink module 1170 encapsulates the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The uplink module 1170 also decapsulates incoming VXLAN packets and forwards only the original inner data packet to the destination VM.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

Figure 12:
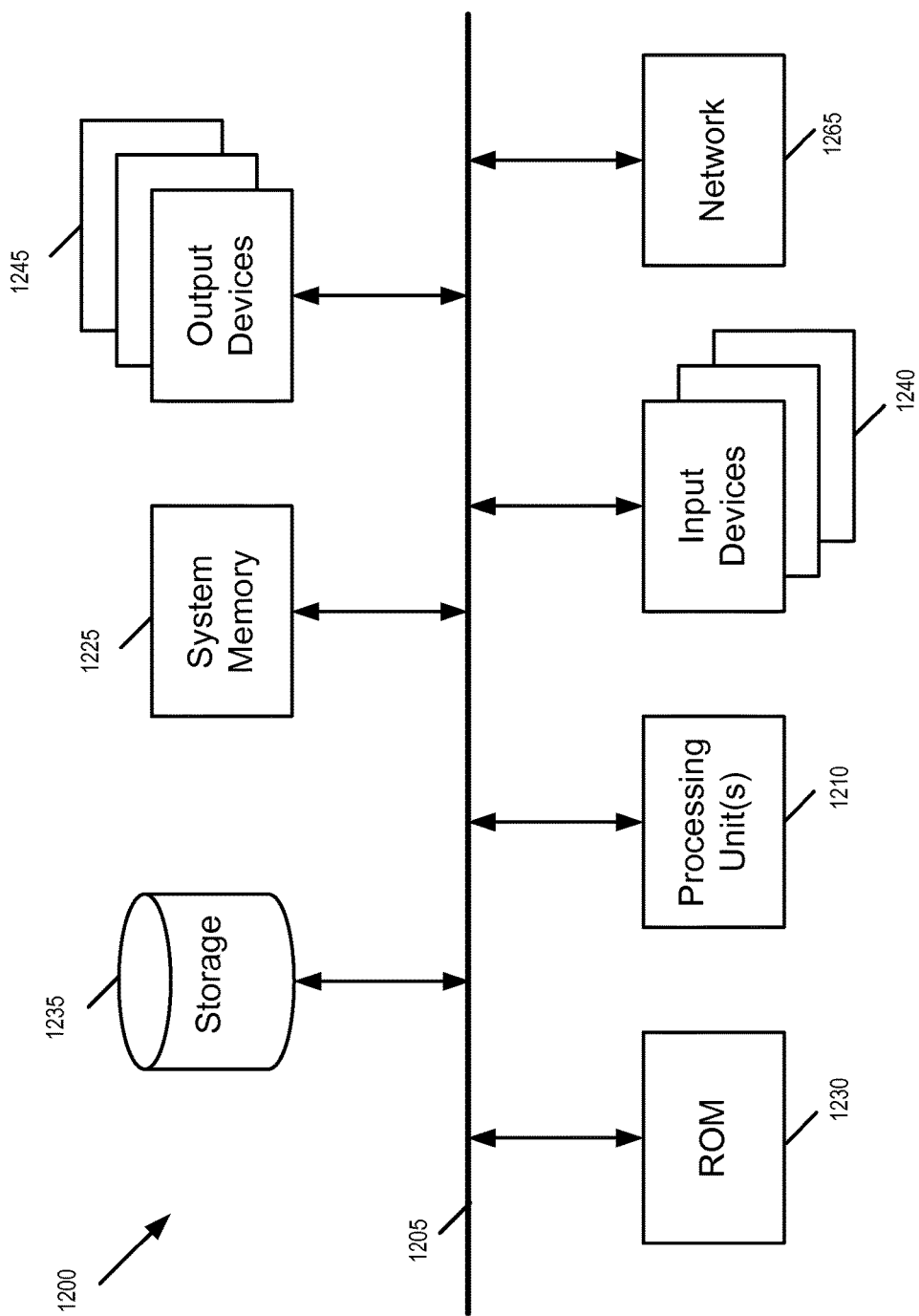
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieves instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD- R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 7 and 10a-b) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method operating on a host computer, the method comprising:
    receiving first and second packets belonging to first and second data flows between a source machine and a destination machine;
    adding a tunnel encapsulation to each of the first and second packets;
    storing in a source port field of the tunnel encapsulation for the first packet a first label from a set of labels received from a network controller and storing in a source port field of the the tunnel encapsulation for the second packet a different, second label from the set of labels, said storing of the different first and second labels to cause the first and second packets to follow different paths to the destination; and
    from the host computer, forwarding the first and second packets along a network infrastructure to the destination machine.

2. The method of claim 1, wherein the tunnel encapsulation for the first and second packets comprises the source port field, a destination port field, a source network address field, and a destination network address field.

3. The method of claim 2, wherein the tunnel encapsulation for the first packet and the tunnel encapsulation for the second packet uses a same source network address and a same destination network address.

4. The method of claim 1, wherein an Equal Cost Multi-Path (ECMP) routing process at a physical router separate from the host computer selects the different paths for the first and second packets based on the different labels used in the source port field of the packets.

5. The method of claim 4, wherein the ECMP routing process uses a hash value generated at least in part based on the source port field of a particular packet to select the path for the particular packet.

6. The method of claim 1, wherein the network controller provides unique sets of labels to a plurality of different host computers.

7. The method of claim 1 further comprising:
    receiving a third packet belonging to the first data flow;
    adding a tunnel encapsulation to the third packet that uses the first label for the source port field value in order to cause the third packet to follow the same path to the destination as the first packet; and
    from the host computer, forwarding the third packet along the network infrastructure to the destination.

8. The method of claim 1, wherein the source machine is a virtual machine that operates on the host machine.

9. The method of claim 8, wherein the virtual machine is a first virtual machine and the host computer is a first host computer, wherein the destination machine is a second virtual machine that operates on a second host computer.

10. The method of claim 9, wherein the first and second tunnel encapsulations use a network address of a first tunnel endpoint associated with a first managed forwarding element on the first host computer as a source network address and a network address of a second tunnel endpoint associated with a second managed forwarding element on the second host computer as a destination network address.

11. A non-transitory machine readable medium storing a program for execution by at least one processing unit of a host computer, the program comprising sets of instructions for:
    receiving first and second packets belonging to first and second data flows between a source machine and a destination machine;
    adding a tunnel encapsulation to each of the first and second packets;
    storing in a source port field of the tunnel encapsulation for the first packet a first label from a set of labels received from a network controller and storing in a source port field of the the tunnel encapsulation for the second packet a different, second label from the set of labels, said storing of the different first and second labels to cause the first and second packets to follow different paths to the destination; and
    from the host computer, forwarding the first and second packets along a network infrastructure to the destination machine.

12. The non-transitory machine readable medium of claim 11, wherein the tunnel encapsulation for the first and second packets comprises the source port field, a destination port field, a source network address field, and a destination network address field.

13. The non-transitory machine readable medium of claim 12, wherein the tunnel encapsulation for the first packet and the tunnel encapsulation for the second packet uses a same source network address and a same destination network address.

14. The non-transitory machine readable medium of claim 11, wherein an Equal Cost Multi-Path (ECMP) routing process at a physical router separate from the host computer selects the different paths for the first and second packets based on the different labels used in the source port field of the packets.

15. The non-transitory machine readable medium of claim 14, wherein the ECMP routing process uses a hash value generated at least in part based on the source port field of a particular packet to select the path for the particular packet.

16. The non-transitory machine readable medium of claim 11, wherein the network controller provides unique sets of labels to a plurality of different host computers.

17. The non-transitory machine readable medium of claim 11, wherein the program further comprises sets of instructions for:

receiving a third packet belonging to the first data flow;
adding a tunnel encapsulation to the third packet that uses the first label for the source port field value in order to cause the third packet to follow the same path to the destination as the first packet; and
from the host computer, forwarding the third packet along the network infrastructure to the destination.

18. The non-transitory machine readable medium of claim 11, wherein the source machine is a virtual machine that operates on the host machine.

19. The non-transitory machine readable medium of claim 18, wherein the virtual machine is a first virtual machine and the host computer is a first host computer, wherein the destination machine is a second virtual machine that operates on a second host computer.

20. The non-transitory machine readable medium of claim 19, wherein the first and second tunnel encapsulations use a network address of a first tunnel endpoint associated with a first managed forwarding element on the first host computer as a source network address and a network address of a second tunnel endpoint associated with a second managed forwarding element on the second host computer as a destination network address.

* * * * *